(12) United States Patent
Tsuruga (10) Patent No.: US 7,865,064 B2
(45) Date of Patent: Jan. 4, 2011

(54) RECORDING/OUTPUT APPARATUS AND RECORDING/OUTPUT METHOD

(75) Inventor: Sadao Tsuruga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1300 days.

(21) Appl. No.: 11/367,387

(22) Filed: Mar. 6, 2006

(65) Prior Publication Data

US 2006/0280483 A1 Dec. 14, 2006

(30) Foreign Application Priority Data

Jun. 9, 2005 (JP) ............... 2005-168978

(51) Int. Cl.
H04N 7/64 (2006.01)
(52) U.S. Cl. ..................... 386/113; 386/114
(58) Field of Classification Search ........... 386/46, 386/109, 112, 111, 124, 125, 113, 66
See application file for complete search history.

(56) References Cited

U.S. PATENT DOCUMENTS

| 2003/0044164 A1 | 3/2003 | Owashi |
| 2004/0001591 A1* | 1/2004 | Mani et al. ............... 380/210 |

FOREIGN PATENT DOCUMENTS

| JP | 08-297922 | 11/1996 |
| JP | 08-336131 | 12/1996 |
| JP | 10-269697 | 10/1998 |
| JP | 2001-110140 | 4/2001 |
| JP | 2001-171490 | 6/2001 |
| JP | 2001-197384 | 7/2001 |
| JP | 2001-268518 | 9/2001 |

OTHER PUBLICATIONS

Japanese Office Action dated Jul. 27, 2010 for Application No. 2005-168978.

* cited by examiner

Primary Examiner—Robert Chevalier
(74) Attorney, Agent, or Firm—Antonelli, Terry, Stout & Kraus, LLP.

(57) ABSTRACT

Formerly, it was difficult to exercise proper control for recording and outputting a plurality of contiguous data. To solve this problem, for example, a plurality of contiguous data are acquired from a stream in which the reference information for reproducing at an acquisition end a clock synchronized with a system clock prevailing at the time of generation is multiplexed. A plurality of timestamped data are then read from recording means. Timestamp information is removed from the read timestamped information. The resulting data without the timestamp information is handled as the read data and output with the timing dependent on the timestamp information. The timestamp information generation operation performed for a write and the output operation performed for a read with the timing dependent on the timestamp information are synchronized with an adjusted clock.

12 Claims, 4 Drawing Sheets

RECORDING/OUTPUT APPARATUS AND RECORDING/OUTPUT METHOD

CLAIM OF PRIORITY

The present application claims priority from Japanese application serial No. P2005-168978, filed on Jun. 9, 2005, the content of which is hereby incorporated by reference into this application.

BACKGROUND OF THE INVENTION

The present invention relates to a technology for recording and outputting a digital broadcast.

For digital broadcasts in Japan, video data and other broadcast data encoded in compliance with the MPEG2 (Moving Picture Experts Group Phase 2) standard are multiplexed in compliance with the MPEG2-TS (Moving Picture Experts Group Phase 2—Transport Stream) standard. There is a known recorder/player for recording and playing an MPEG2-TS in whole or in part (Japanese Patent Laid-open No. 2001-110140). Further, there is a known receiver that incorporates a plurality of digital tuners to cover the increased use of digital broadcasts (Japanese Patent Laid-open No. 2001-197384).

Furthermore, disclosed is a technology for extracting an arbitrary stream from multiplex data by inserting a special packet (timestamp packet) for storing a PCR (Program Clock Reference) value with a view toward playing a stream without regard to its bit rate (Japanese Patent Laid-open No. 2001-171490). Another disclosed technology records data by adding time information (timestamp) that is phase-synchronized with a digital compressed signal, and restores a packet signal time interval in accordance with the timestamp (Japanese Patent Laid-open No. 8-336131).

SUMMARY OF THE INVENTION

An MPEG2-TS is a series of multiplexed transport packets that contain, for instance, the video data about a plurality of broadcast programs. Within the MPEG2-TS, the transport packets concerning arbitrary broadcast programs are continuously multiplexed with intervals provided. One or a plurality of transport. packets for different broadcast programs exist in the intervals. Therefore, when a specific broadcast program is to be extracted from the MPEG2-TS, recorded onto a hard disc or other recording medium, and output, it is important that the transport packet intervals prevailing before recording be reproduced at the time of output.

In the conventional recorder/player disclosed by Japanese Patent Laid-open No. 2001-110140, a PCR (Program Clock Reference), which is multiplexed in an MPEG2-TS, is used as the reception arrival time for each predetermined transport packet, which constitutes the received MPEG2-TS, at the time of recording into a recording/output apparatus. In addition, a timestamp is generated and added for recording purposes by a time counter that operates in accordance with a clock generated by a clock generator. This clock is without a PLL and independent of a 27 MHz system clock that is reproduced by a PLL (Phase Lock Loop) technology. On the other hand, when the recording/output apparatus performs a playback operation, the recorded transport packet is output after comparing the time counter, which operates in accordance with the above-mentioned independent clock, with the timestamp, which is added to the transport packet as the reception arrival time. The playback operation is then performed so that the recorded transport packet intervals agree with the reception timing. However, the conventional recorder/player uses, for instance, a 27-MHz crystal oscillator for the clock to be used with the time counter. The frequency stability of a generally used crystal oscillator is often lower than 27-MHz±30 ppm. When the time counter operates in accordance with a crystal oscillator having such accuracy, the transport packet intervals recorded and played by the recording/output apparatus differ from those received. When, for instance, a multiplexed PCR is used for an output MPEG2-TS of the recording/output apparatus, the worst-case accuracy of the 27 MHz system clock played by the PLL (Phase Lock Loop) technology is 27 MHz±60 ppm.

The above accuracy is lower than 27 MHz±30 ppm, which is the required system clock accuracy for a situation where an MPEG2-TS, which is defined by the MPEG standard, is recorded, output, or played.

When a video/audio decoder uses the above playback system clock to perform a decoding process, an STD buffer, which is positioned before the decoder, overflows or underflows, thereby causing an imaging problem. More specifically, the image output by the decoder suffers from block noise or freezes. Even when the STD buffer does not overflow or underflow, normal color reproduction (display) does not result if the system clock deviation is not within a permissible range for the image color frequency.

The apparatus disclosed by Japanese Patent Laid-open No. 2001-197384 is a digital broadcast receiver that incorporates a plurality of digital tuners and allows the digital tuners to receive different broadcast programs (different pieces of content). It is assumed that, for instance, the plurality of incorporated digital tuners are used to receive different broadcast programs (different pieces of content), and the recording/output apparatus disclosed by Japanese Patent Laid-open No. 2001-110140 is used to simultaneously record the MPEG2-TS for each broadcast program. With such an assumption, a crystal oscillator and time counter for generating an independent clock for simultaneous recording are required. In this case, too, however, the above-mentioned problem exists.

A technology for extracting a stream in consideration of a timestamp is disclosed by Japanese Patent Laid-open No. 2001-171490. However, Japanese Patent Laid-open No. 2001-171490 does not state a specific method for timestamp creation or explain what timestamp should be created in what manner.

A technology for restoring a packet signal time interval by using a timestamp that is phase-synchronized with a digital compressed signal is disclosed by Japanese Patent Laid-open No. 8-336131. However, it does not thoroughly describe a specific method for timestamp creation.

The present invention has been made in view of the above circumstances. It is an object of the present invention to provide a recording/output apparatus and recording/output method for properly outputting recorded data.

To accomplish the above object, the recording/output apparatus for recording and playing an MPEG2-TS is configured so that the recorded and output transport packet intervals agree with the reception timing. Further, the recording/output apparatus for simultaneously (not necessarily in the strict sense of the word) recording and playing a plurality of MPEG2-TSs is configured so that the recorded and played transport packet intervals agree with the reception timing.

In other words, the recording/output apparatus should be configured as defined, for instance, in claim 1.

The present invention makes it possible to provide a recording/output apparatus and recording/output method for exercising control to ensure that recording and output operations are properly performed.

DETAILED DESCRIPTION OF THE PREFERRED EMBODIMENTS

An embodiment of the present invention will now be described in detail with reference to the accompanying drawings. Like reference numerals and symbols denote like elements.

Figure 1:
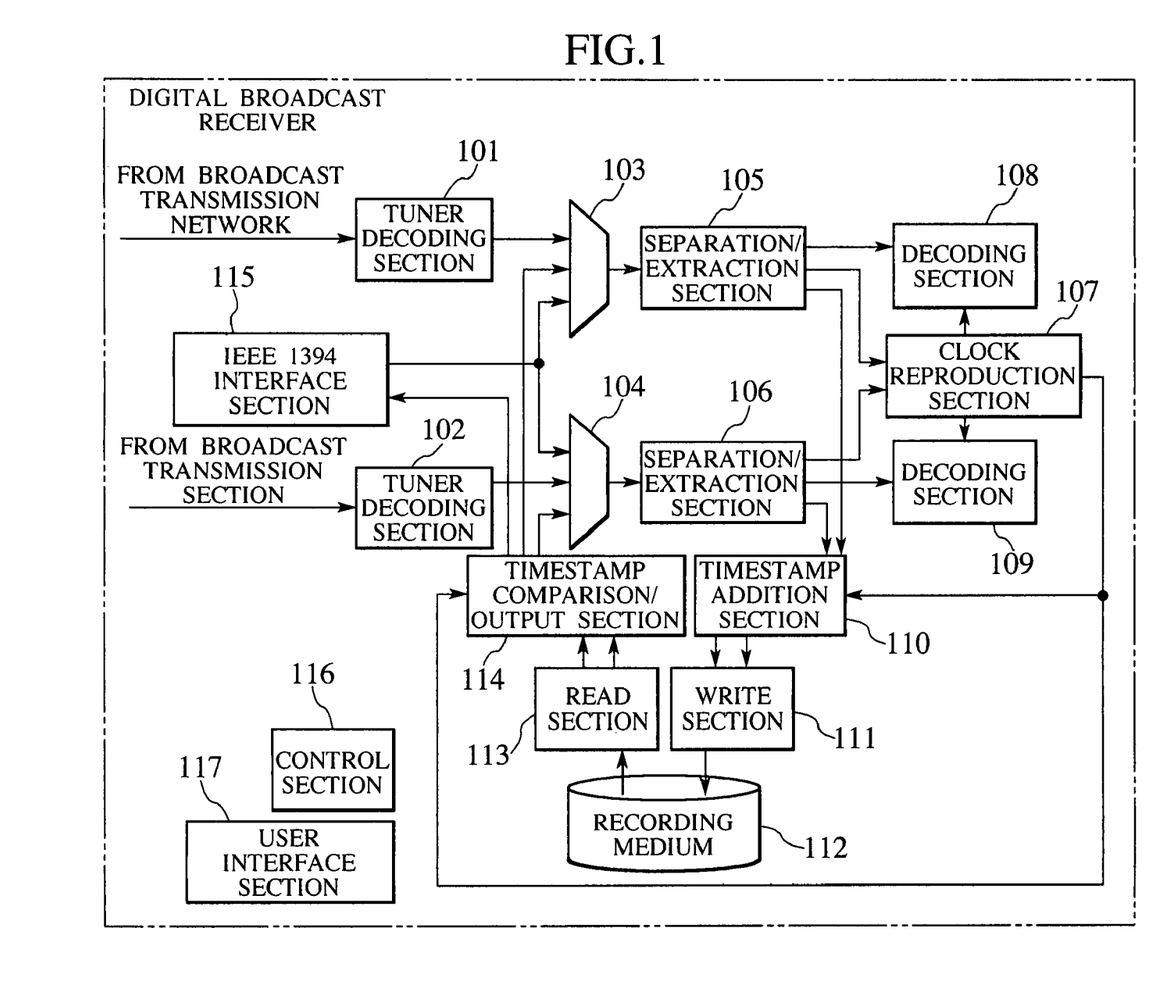
FIG. 1 is a block diagram illustrating the configuration of a digital broadcast receiver that incorporates a recording/output apparatus according to one embodiment of the present invention.

FIG. 1 illustrates a digital broadcast receiver that incorporates a recording/output apparatus according to an embodiment of the present invention. As indicated in FIG. 1, the digital broadcast receiver includes tuner decoding sections 101, 102, selectors 103, 104, separation/extraction sections (e.g., demultiplexers) 105, 106, a clock reproduction section 107, decoding sections (e.g., MPEG decoders) 108, 109, a timestamp addition section 110, a write section 111, a recording medium (e.g., hard disc, memory, optical disc, or magnetooptical disc) 112, a read section 113, a timestamp comparison/output section 114, an IEEE 1394 interface section 115, a control section (e.g., CPU (Central Processing Unit)) 116, and a user interface section (including, for instance, a keyboard, mouse, remote controller, or other input device; a video output or display device based on a CRT (Cathode Ray Tube), LCD (Liquid Crystal Display), or PDP (Plasma Display Panel); and an audio output device including a speaker) 117.

Tuner decoding section 101 receives a digital broadcast signal from a digital broadcast source provided by a broadcast station not shown via a satellite, terrestrial, cable, or other broadcast transmission network. This tuner decoding section 101 performs a tuning process and a wave detection process on a physical or virtual channel frequency that is specified via a remote controller or other user operating control on the user interface section 117 and the control section 116. Then, the tuner decoding section 101 outputs to selector 103 an MPEG2-TS (that is, a digital broadcast signal) that has been subjected to digital demodulation and error correction.

Selector 103 performs a 3-input 1-output selection process under the control of the control section 116, and delivers the resulting output to separation/extraction section 105. Separation/extraction section 105 separates/extracts from an entered MPEG2-TS a transport packet of a channel (broadcast program) that is specified via a remote controller or other user operating control on the user interface section 117 and the control section 116, and outputs the separated/extracted transport packet to the timestamp addition section 110. This separation/extraction section 105 separates/extracts a video/audio PES (Packetized Elementary Stream) or ES (Elementary Stream) from a transport packet of a channel (broadcast program) that is specified via a remote controller or other user operating control on the user interface section 117 and the control section 116, and outputs the separated/extracted video/audio PES or ES to decoding section 108. Then the separation/extraction section 105 extracts a PCR (Program Clock Reference) from a transport packet of a channel (broadcast program) that is specified via a remote controller or other user operating control on the user interface section 117 and the control section 116, and outputs the extracted PCR to the clock reproduction section 107. Decoding section 108 receives the PES or ES of video and/or audio from separation/extraction section 105, compares the DTS (Decoding Time Stamp) or PTS (Presentation Time Stamp) of the PES or ES with an STC count value fed from the clock reproduction section 107, which will be described later, adjusts the decoding/display timing to achieve decoding, and outputs the decoded video and/or audio to the user interface section 117.

Tuner decoding section 102 receives a digital broadcast signal from a digital broadcast source, which is provided by a broadcast station not shown, via a satellite, terrestrial, cable, or other broadcast transmission network. This tuner decoding section 102 performs a tuning process and a wave detection process on a physical or virtual channel frequency that is specified via a remote controller or other user operating control on the user interface section 117 and the control section 116. Then, the tuner decoding section 102 outputs to selector 103 an MPEG2-TS that has been subjected to digital demodulation and error correction. Selector 104 performs a 3-input 1-output selection process under the control of the control section 116, and delivers the resulting output to separation/extraction section 106. Separation/extraction section 106 separates/extracts from an entered MPEG2-TS a transport packet of a channel (that is, a broadcast program) that is specified via a remote controller or other user operating control on the user interface section 117 and the control section 116, and outputs the separated/extracted transport packet to the timestamp addition section 110. This separation/extraction section 106 separates/extracts a video/audio PES (Packetized Elementary Stream) or ES (Elementary Stream) from a transport packet of a channel (broadcast program) that is specified via a remote controller or other user operating control on the user interface section 117 and the control section 116, and outputs the separated/extracted video/audio PES or ES to decoding section 109. Then, the separation/extraction section extracts a PCR (Program Clock Reference) from a transport packet of a channel (broadcast program) that is specified via a remote controller or other user operating control on the user interface section 117 and the control section 116, and outputs the extracted PCR to the clock reproduction section 107.

Decoding section 109 receives the PES or ES of video and/or audio from separation/extraction section 106, compares the DTS (Decoding Time Stamp) or PTS (Presentation Time Stamp) of the PES or ES with an STC count value fed from the clock reproduction section 107, which will be described later, adjusts the decoding/display timing to achieve decoding, and outputs the decoded video and/or audio to the user interface section 117.

The user interface section 117 displays and/or plays the decoded video and/or audio with an output device (the display device and/or audio output device).

The clock reproduction section 107 uses the PCR to reproduce a receiver system clock that is synchronized (for frequency/phase matching) with the system clock of a broadcast station's encoding/multiplexing section, outputs the reproduced system clock to the timestamp addition section 110 and timestamp comparison/output section 114, and outputs to decoding sections 108 and 109 the STC count value of an STC counter that operates in accordance with the reproduced system clock.

The timestamp addition section 110 generates a timestamp by using a counter that operates in accordance with the system clock reproduced by the clock reproduction 107, adds the timestamp to (or embeds the timestamp into) the transport packets separated/extracted by separation/extraction sections 105 and 106, and outputs the transport packets to the write section 111.

The write section 111 performs a process for recording the transport packets, to which the timestamp is added by the timestamp addition section 110, on the recording medium 112. As a result, one stream having a plurality of timestamped transport packets, which contain the video data and/or audio data about a certain channel (that is, a certain broadcast program), is stored on the recording medium 112 as a single file or two or more separated data files.

The timestamp is the time information about a timestamped transport packet. For example, the timestamp represents the time at which a transport packet was input from a separation/extraction section 105, 106 to the timestamp addition section 110, or the time difference from a reference transport packet (e.g., the preceding or leading transport packet). This timestamp differs from a timestamp that is already included in a transport packet, such as a PTS or DTS.

The read section 113 sequentially reads from the recording medium 14 a plurality of timestamped transport packets contained in a specified stream, and outputs the read transport packets to the timestamp comparison/output section 114. The timestamp comparison/output section 114 compares the counter value of a counter that operates in accordance with the system clock reproduced by the clock reproduction section 107 with the timestamp of a timestamped transport packet read by the read section 113. If the compared value and timestamp coincide with each other, the timestamp comparison/output section 114 deletes (removes) the timestamp from the timestamped transport packet and outputs the transport packet to the selectors 103, 104 and the IEEE 1394 interface section 115.

A D-VHS video deck (not shown) is connected to the IEEE 1394 interface section 115 via an IEEE 1394 (e.g., i.Link (registered trademark)) cable. The IEEE 1394 interface section 115 receives transport packets from which timestamps were deleted by the timestamp comparison/output section 114, and outputs the transport packets to the D-VHS video deck (not shown) via the IEEE 1394 cable (not shown). Further, the IEEE 1394 interface section 115 receives transport packets that are input from the D-VHS video deck (not shown) via the IEEE 1394 cable (not shown), and outputs the transport packets to the selectors 103, 104. Alternatively, a separate communication interface section may be furnished in addition to or in place of the IEEE 1394 interface section 115 for the purpose of transferring data to an external storage medium (e.g., D-VHS videotape or other magnetic tape) in compliance with another communication interface such as a LAN or wireless LAN interface.

The control section 116 is connected to various sections of the digital broadcast receiver via a bus section (not shown). The control section 116 controls the operation of the entire digital broadcast receiver, and performs various processes by receiving various instruction signals from the user via the remote controller or other control on the user interface section 117 and controlling various sections connected via the bus section (not shown) in compliance with the instruction signals.

A typical process involving the MPEG2-TS format has been described above. However, an operation can also be performed when the MPEG2-PS (Moving Picture Experts Group Phase 2—Program Stream) format is used. When the MPEG2-PS format is used, the clock reproduction section 107 reproduces the receiver system clock by using an SCR (System Clock Reference).

The configuration and operation of the clock reproduction section 107 will now be described in detail with reference to FIG. 2.

Figure 2:
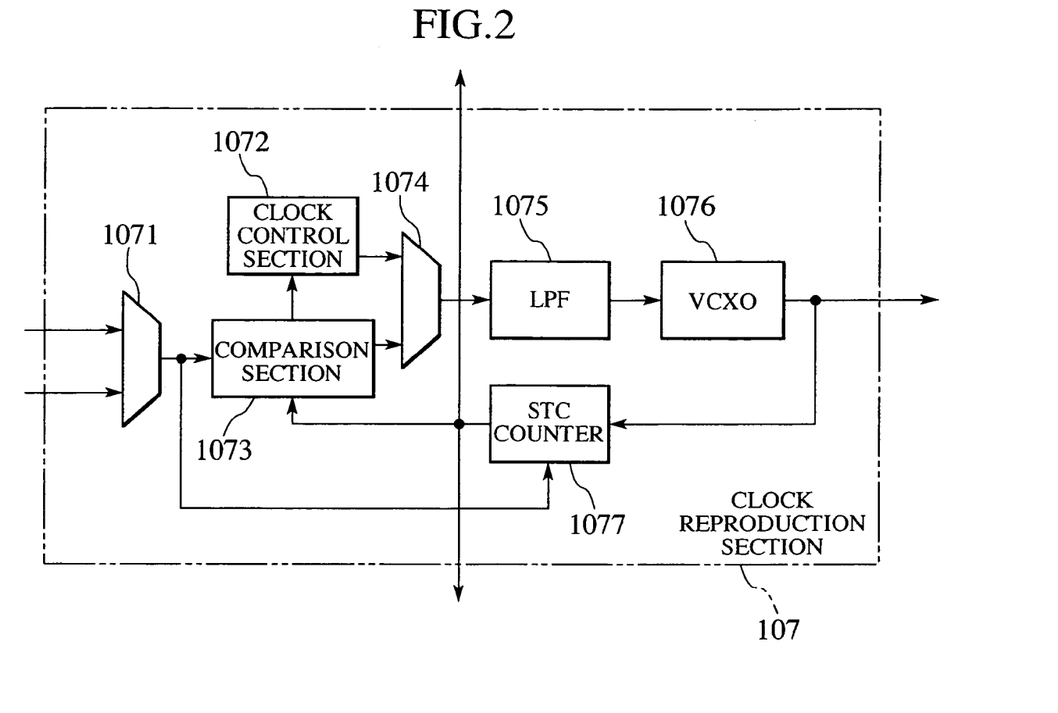
FIG. 2 is a block diagram illustrating the detailed configuration of a clock reproduction section.

As indicated in FIG. 2, the clock reproduction section 107 includes selectors 1071, 1074, a clock control section 1072, a comparison section 1073, an LPF (Low Pass Filter) 1075, a VCXO (Voltage Controlled Crystal Oscillator) 1076, and an STC counter 1077.

Selector 1071 performs a 2-input 1-output selection process under the control of the control section 116. The PCRs separated/extracted by the separation/extraction sections 105, 106 are input to selector 1071. The PCR selected by selector 1071 is output to the comparison section 1073 and STC counter 1077. When the PCR is input, the comparison section 1073 compares the value of the PCR with the STC count value of the STC counter 1077, which will be described later, calculates the difference between the compared values, and outputs the calculation result to selector 1074 and clock control section 1072. The clock control section 1072 records and stores the difference value calculated by the comparison section 1073 as a clock control value or calculates an average difference value and records and stores the average difference value as a control value. In compliance with instructions from the control section 116, the clock control section 1072 outputs the recorded value to selector 1074. Selector 1074 performs a 2-input 1-output selection process under the control of the control section 116. The inputs from the comparison section 1073 and clock control section 1072 are output to the LPF 1075. The LPF 1075 receives an input signal from selector 1074, smoothes the input signal by eliminating its high-frequency component, and outputs smoothed input signal to the VCXO 1076. The VCXO 1076 oscillates, for instance, at a center frequency of 27 MHz, generates a clock whose oscillation frequency is controlled in accordance with the signal that was smoothed when the LPF 1075 eliminated its high-frequency component, and outputs the generated clock to the STC counter 1077, timestamp addition section 110, and timestamp comparison/output section 114. The STC counter 1077 operates in accordance with the clock generated by the VCXO 1076 while using the PCR value fed from selector 1071 as an initial value. This counter 1077 outputs its count value to the comparison section 1073 and decoding sections 108, 109.

When selector 1074 selects an output of the comparison section 1073 in a situation where the above configuration is employed, the clock reproduction section 107 employs a PLL (Phase Lock Loop) configuration. Therefore, the PCR selected by selector 1071 can be used to reproduce a clock that is synchronized (for frequency/phase matching) with the system clock of a broadcast station's encoding/multiplexing section. Meanwhile, when selector 1074 selects an output of the clock control section 1072, a clock can be generated in accordance with a clock control value that is recorded/stored in the clock control section 1072. Further, when the clock control value is generated and recorded while a digital broadcast is properly received, the clock generated in accordance with the control value is infinitely close to the system clock of a broadcast station's encoding/multiplexing section in frequency.

The configuration and operation of the timestamp addition section 110 will now be described in detail with reference to FIG. 3.

Figure 3:
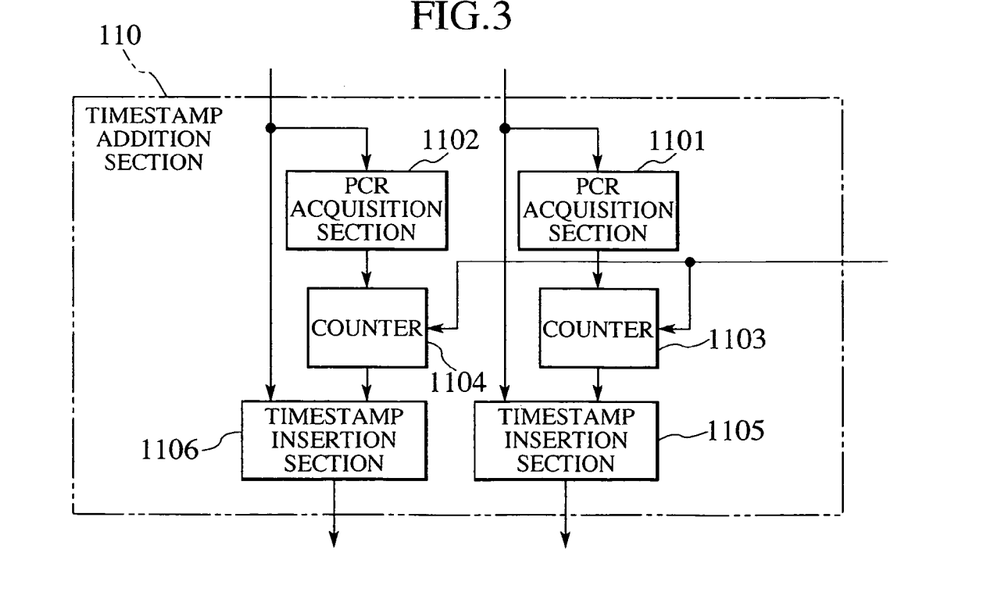
FIG. 3 is a block diagram illustrating the detailed configuration of a timestamp addition section.

As indicated in FIG. 3, the timestamp addition section 110 includes PCR acquisition sections 1101, 1102, counters 1103, 1104, and timestamp insertion sections 1105, 1106.

PCR acquisition section 1101 checks transport packets separated/extracted by separation/extraction section 105, acquires a transport packet that carries a PCR, and outputs the value of the PCR to counter 1103. Counter 1103 operates in accordance with the clock reproduced by the clock reproduction section 107 while using the PCR value acquired by PCR acquisition section 1101 as an initial value. This counter 1103 outputs its count value to timestamp insertion section 1105. Timestamp insertion section 1105 generates a timestamp in accordance with the count value fed from counter 1103 at the time when a transport packet separated/extracted by separation/extraction section 105 is input, adds the timestamp to (or embeds the timestamp in) the transport packet, and outputs the timestamped transport packet to the write section 111.

PCR acquisition section 1102 checks transport packets separated/extracted by separation/extraction section 106, acquires a transport packet that carries a PCR, and outputs the value of the PCR to counter 1104. Counter 1104 operates in accordance with the clock reproduced by the clock reproduction section 107 while using the PCR value acquired by PCR acquisition section 1102 as an initial value. This counter 1104 outputs its count value to timestamp insertion section 1106. Timestamp insertion section 1106 generates a timestamp in accordance with the count value fed from counter 1104 at the time when a transport packet separated/extracted by separation/extraction section 106 is input, adds the timestamp to (or embeds the timestamp in) the transport packet, and outputs the timestamped transport packet to the write section 111.

The configuration and operation of the timestamp comparison/output section 114 will now be described in detail with reference to FIG. 4.

Figure 4:
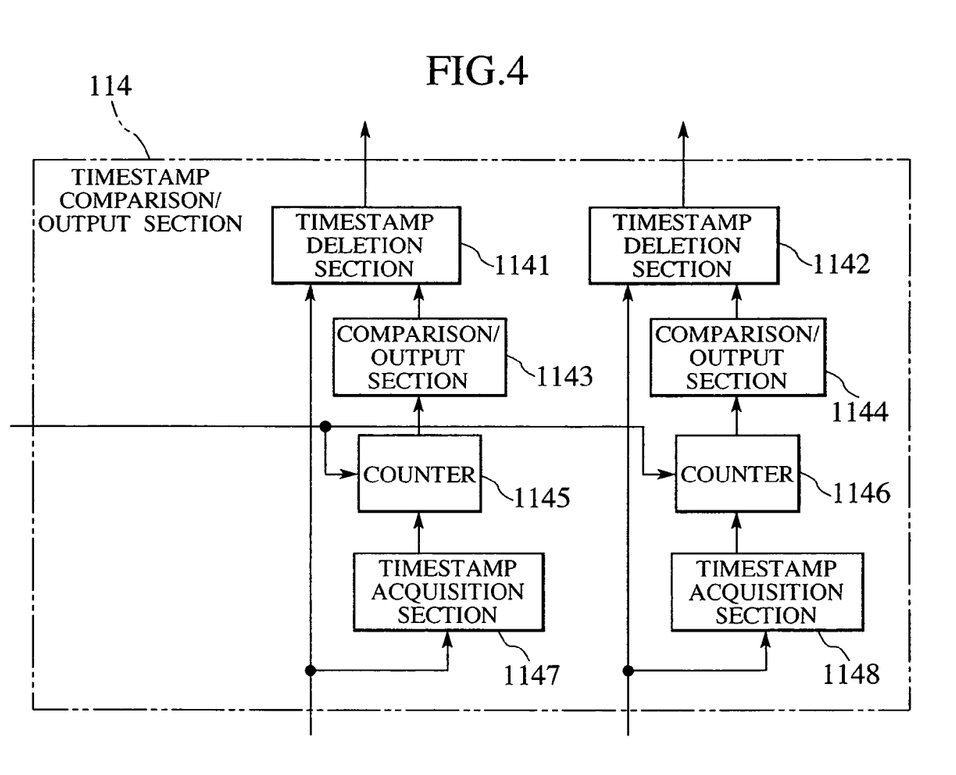
FIG. 4 is a block diagram illustrating the detailed configuration of a timestamp comparison/output section.

As indicated in FIG. 4, the timestamp comparison/output section 114 includes timestamp deletion sections 1141, 1142, comparison/output sections 1143, 1144, counters 1145, 1146, and timestamp acquisition sections 1147, 1148.

Timestamp acquisition section 1147 acquires the timestamp value of a timestamped transport packet that was read by the read section 113, and outputs the acquired timestamp value to counter 1145. Counter 1145 operates in accordance with the clock reproduced by the clock reproduction section 107 while using the timestamp value acquired by timestamp acquisition section 1147 as an initial value. This counter 1145 outputs its count value to comparison/output section 1143. Comparison/output section 1143 compares the counter value of counter 1145 against the timestamp of the timestamped transport packet read by the read section 113. When the compared count value and timestamp agree with each other, comparison/output section 1143 outputs the timestamped transport packet to timestamp deletion section 1141. Timestamp deletion section 1141 deletes (removes) the timestamp from the timestamped transport packet fed from comparison/output section 1143 and outputs the transport packet, which is now without the timestamp, to selector 103 or IEEE 1394 interface section 115.

Timestamp acquisition section 1148 acquires the timestamp value of a timestamped transport packet that was read by the read section 113, and outputs the acquired timestamp value to counter 1146. Counter 1146 operates in accordance with the clock reproduced by the clock reproduction section 107 while using the timestamp value acquired by timestamp acquisition section 1148 as an initial value. This counter 1146 outputs its count value to comparison/output section 1144. Comparison/output section 1144 compares the counter value of counter 1146 with the timestamp of the timestamped transport packet read by the read section 113. When the compared count value and timestamp agree with each other, comparison/output section 1144 outputs the timestamped transport packet to timestamp deletion section 1142. Timestamp deletion section 1142 deletes (removes) the timestamp from the timestamped transport packet fed from comparison/output section 1144 and outputs the transport packet, which is now without the timestamp, to selector 104 or IEEE 1394 interface section 115.

Figures 5A, 5B:
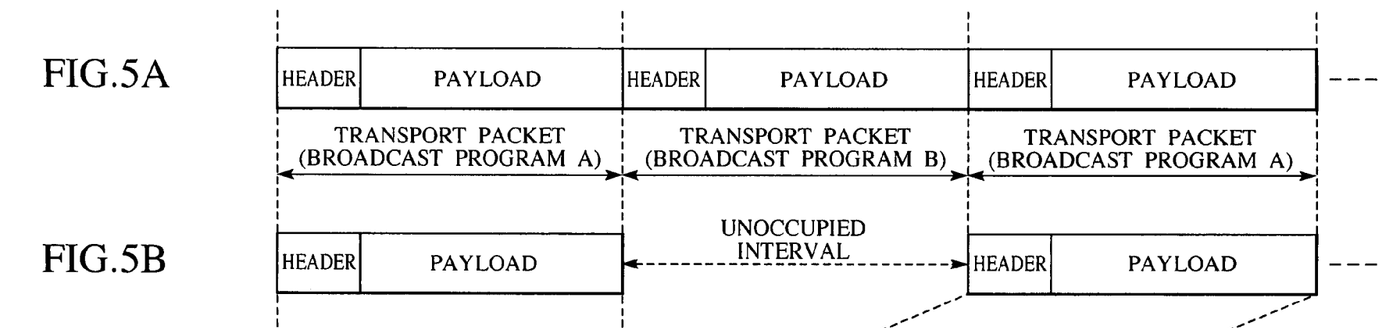
FIG. 5 illustrates the structure of data that is handled in the digital broadcast receiver.

The structure of data handled in the digital broadcast receiver will now be described with reference to FIG. 5. In the digital broadcast receiver, the MPEG2-TS to be input from tuner decoding sections 101 and 102 to separation/extraction sections 105 and 106 via selectors 103 and 104 is as indicated in FIG. 5A. A large number of transport packets having a predetermined number of bytes (e.g., 188 bytes) are multiplexed in the MPEG2-TS for use in digital broadcasting. Each transport packet comprises a transport header (hereinafter referred to as the TS header) and a payload. In other words, the MPEG2-TS includes a series of transport packets that correspond to digital video source and other video signals. The MPEG2-TS makes it possible to multiplex and transmit a plurality of data including video and audio data. The TS header is provided with a field for storing a PID (Packet Identification) that identifies the payload in a transport packet. When a digital signal is to be played back, payloads having the same PID are first combined to extract desired data and play the extracted data. For example, when payloads having the same PID are combined with each other, a PES packet is obtained. Particular information (not shown) is attached to the MPEG2-TS to ensure that video and audio are played back with the timing predefined by a broadcast station or other broadcast source. The particular information includes a program time standard reference value that is named "PCR," time management information for playback that is named "PTS," and time management information for decoding that is named "DTS." The PCR is used to set the broadcast station's standard time and effect calibration. It is embedded in the MPEG2-TS for transmission. The PTS is the information for indicating the playback timing. The DTS is the information for indicating the decoding timing. The PTS and DTS are embedded in a PES header and transmitted. In the MPEG2-TS described above, the transport packets for broadcast program (channel) A and the transport packets for broadcast program (channel) B are alternately arranged.

When a separation/extraction section 105, 106 into which the MPEG2-TS is input selects a transport packet for broadcast program (channel) A and outputs it to the timestamp addition section 110, the data structure is as indicated in FIG. 5B. In other words, when an MPEG2-TS containing a plurality of transport packets is to be received, the transport packet of a certain broadcast program (channel) A is first received. The transport packet of the next broadcast program (channel) A is received after a packet interval (that is, the length of unoccupied time) for the transport packet of broadcast program (channel) B, which is removed without being extracted. Any timestamp may be attached to the transport packet of this broadcast program (channel) A as far as it represents the information that indicates the packet interval for the transport packet of program (channel) A. For example, it may represent the time at which the timestamp addition section 110 received the transport packet of broadcast program (channel) A or the time difference between the instant at which the transport packet of broadcast program (channel) A (or the transport packet of an earlier received, predetermined broadcast program (channel) A) was received and the instant at which the timestamp addition section 110 received the transport packet of the next broadcast program (channel) A.

Figure 5C:
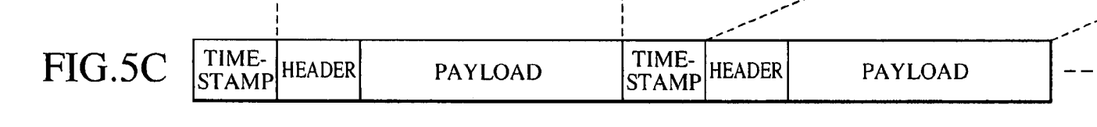

FIG. 5C shows the data structure within the recording medium 112 that prevails when individual transport packets in a stream shown in FIG. 5C are timestamped and stored on the recording medium 112. In other words, when the recording medium 112 stores a plurality of timestamped transport packets, there is no more physical interval between a certain timestamped transport packet and the next timestamped transport packet. The interval can be identified from the information indicated by the timestamp attached to a timestamped transport packet when the timestamp comparison/output section 114 reads a timestamped transport packet via the read section 113.

As is obvious from FIGS. 5A to 5C, the present embodiment adds a timestamp, which has a predetermined data length, to a transport packet shown in FIG. 5B. As a result, the timestamped transport packet is larger in data size than the transport packet without a timestamp. However, it is not always necessary to add a timestamp to each transport packet. The timestamp may be provided in any manner as far as it defines a transport packet (e.g., a special timestamp may be embedded in a predefined field or any unoccupied field of a transport packet).

The digital broadcast receiver, which incorporates the recording/output apparatus described above, has a plurality of tuner decoding sections. Therefore, the digital broadcast receiver is capable of simultaneously recording two channels (broadcast programs). In such an instance, the clock reproduction section 107 can generate a clock in accordance with a PCR that is multiplexed in an MPEG2-TS for either of the digital broadcasts received by the plurality of tuner decoding sections. Consequently, it is possible to reproduce a highly accurate receiver system clock that is synchronized (for frequency/phase matching) with the system clock of a broadcast station's encoding/multiplexing section. Since the reproduced system clock is used when the timestamp addition section 110 performs a process for recording and the timestamp comparison/output section 114 performs a process for playback, the packet intervals prevailing at the time of recording can be accurately reproduced at the time of playback. Further, the reproduced system clock is also used when the decoding sections perform a decoding process. In other words, when either of the plurality of tuner decoding sections receives a digital broadcast in a situation where a plurality of processes are to be performed for recording, playback, or decoding, a highly accurate receiver system clock can be reproduced. With the reproduced system clock, it is possible to perform a plurality of recording, playback, or decoding processes. Even if all digital broadcasts are halted so that no such broadcasts can be received, a clock can be generated in accordance with a clock control value prevailing at the time of digital broadcast reception that is recorded/stored in the clock control section 1072. When the operation described above is performed, it is possible to generate a clock whose frequency is infinitely close to that of the system clock of a broadcast station's encoding/multiplexing section, that is, a clock that meets the system clock accuracy requirements of the MPEG standard. This makes it possible to properly perform a plurality of recording/playback processes in relation to the recording/output apparatus or a plurality of decoding processes in the decoding sections 108, 109.

When the present embodiment is described with reference to FIG. 1, it is assumed that the recording medium 112 is built in the digital broadcast receiver. However, an alternative is to use a removable recording medium that complies with the iVDR (Information Versatile Disc for Removable usage) standard.

What is claimed is:

1. A recording/output apparatus comprising:
an acquisition section which acquires a plurality of data;
a clock generation section which generates a clock;
a clock frequency adjustment section which adjusts a frequency of a clock generated by the clock generation section;
a write section which generates timestamp information, which represents time information about the plurality of acquired data, attaches the timestamp information to the plurality of acquired data, and causes a recording section to record the resulting plurality of timestamped data;
a read section which reads the plurality of timestamped data from the recording section, and outputs the read data with the timing dependent on the timestamp information; and
a clock adjustment value storage section which stores a clock adjustment value;
wherein a timestamp information generation operation that the write section performs and an output operation that the read section performs with the timing dependent on the timestamp information are synchronized with a clock adjusted by the clock frequency adjustment section; and
wherein the clock frequency adjustment section adjusts the frequency of the clock in accordance with the clock adjustment value stored in the clock adjustment value storage section.

2. A recording/output apparatus comprising:
an acquisition section which acquires a plurality of contiguous data on an individual input stream basis from a plurality of input streams in which reference information for reproducing at an acquisition end a clock synchronized with a system clock prevailing at the time of generation is multiplexed;
a clock generation section which generates a clock;
a clock frequency adjustment section which adjusts a frequency of a clock generated by the clock generation section;
a write section which generates, for each input stream, timestamp information, which represents the time information about the plurality of data acquired on an individual input stream basis, attaches the timestamp information to the plurality of acquired data, and causes a recording section to manage and record the resulting plurality of acquired data on an individual input stream basis;
a read section which reads the plurality of timestamped data, which are managed on an individual input stream basis, from the recording section, and outputs the read data with the timing dependent on the timestamp information on an individual input stream basis; and
a clock adjustment value storage section which stores a clock adjustment value;
wherein a timestamp information generation operation that the write section performs and a read operation that the read section performs with the timing dependent on the timestamp information are synchronized with a clock adjusted by the clock frequency adjustment section; and
wherein the clock frequency adjustment section adjusts the frequency of the clock in accordance with the clock adjustment value stored in the clock adjustment value storage section.

3. The recording/output apparatus according to claim 1, wherein each of the plurality of contiguous data is a transport packet contained in a transport stream.

4. A recording/output apparatus comprising:
- a reception section which receives broadcast data in which a plurality of packets are multiplexed;
- a channel selection section which selects a channel of the broadcast data received by the reception section;
- a separation/extraction section which separates/extracts the broadcast data selected by the channel selection section;
- a decoding section which decodes the broadcast data separated/extracted by the separation/extraction section;
- a clock generation section which generates a clock;
- a clock frequency adjustment section which adjusts a frequency of a clock generated by the clock generation section;
- a data write section which generates, for each packet of the data received by the reception section, timestamp information, which represents the time information about the data, attaches the generated timestamp information to the data, and writes the resulting timestamped data in a recording section;
- a data read section which reads the timestamped data from the recording section, and outputs the read data in accordance with the timestamp information;
- a control section which exercises control so that a timestamp information generation operation that the data write section performs and an output operation that the data read section performs in accordance with the timestamp information are in agreement with a clock adjusted by the clock frequency adjustment section; and
- a clock adjustment value storage section which stores a clock adjustment value;
- wherein the clock frequency adjustment section adjusts the frequency of the clock in accordance with the clock adjustment value stored in the clock adjustment value storage section.

5. A recording/output method comprising the steps of:
- receiving broadcast data in which a plurality of packets are multiplexed;
- selecting a channel for the received broadcast data;
- separating/extracting the channel-selected broadcast data;
- decoding the separated/extracted broadcast data;
- generating a clock;
- storing a clock adjustment value storage in a clock adjustment value storage section;
- adjusting a frequency of the generated clock;
- generating timestamp information, which represents the time information about the received data, on an individual packet basis, attaching the generated timestamp information to the data, and writing the resulting timestamped data; and
- reading the timestamped data, and outputting the read data in accordance with the timestamp information;
- wherein the timestamp information generation operation and the output operation in accordance with the timestamp information are in agreement with the adjusted clock; and
- wherein in the step of adjusting a frequency of the generated clock, the clock frequency is adjusted in accordance with the clock adjustment value stored in the clock adjustment value storage section in the step of storing a clock adjustment value.

6. A recording/output apparatus comprising:
- a first reception section and a second reception section, each of which receives broadcast data in which a plurality of packets are multiplexed;
- a first channel selection section which selects respective channels of the broadcast data received by the first reception section;
- a second channel selection section which selects respective channels of the broadcast data received by the second reception section;
- a first separation/extraction section which separates/extracts the respective broadcast data selected by the first channel selection section;
- a second separation/extraction section which separates/extracts the respective broadcast data selected by the second channel selection section
- a first decoding section which decodes the respective broadcast data separated/extracted by the first separation/extraction section;
- a second decoding section which decodes the respective broadcast data separated/extracted by the second separation/extraction section;
- a clock generation section which generates a clock;
- a clock frequency adjustment section which adjusts a frequency of the clock generated by the clock generation section;
- a data write section which generates, for each packet of the data received by the first reception section and the second reception section, timestamp information, which represents the time information about the data, attaches the generated timestamp information to the data, and writes the resulting timestamped data in a recording section;
- a data read section which reads the timestamped data from the recording section, and outputs the read data in accordance with the timestamp information;
- a control section which exercises control so that a timestamp information generation operation that the data write section performs and an output operation that the data read section performs in accordance with the timestamp information are in agreement with a clock adjusted by the clock frequency adjustment section; and
- a clock adjustment value storage section which stores a clock adjustment value;
- wherein the clock frequency adjustment section adjusts the frequency of the clock in accordance with the clock adjustment value stored in the clock adjustment value storage section.

7. The recording/output apparatus according to claim 1, wherein the read section which reads the plurality of timestamped data from the recording section, removes the timestamp information from the plurality of read timestamped data before outputting the resulting read data with the timing dependent on the timestamp information.

8. The recording/output apparatus according to claim 2, wherein the read section which reads the plurality of timestamped data, which are managed on an individual input stream basis, from the recording section, then removes the timestamp information from the plurality of read timestamped data before outputting the resulting read data with the timing dependent on the timestamp information on an individual input stream basis.

9. The recording/output apparatus according to claim 4, wherein the data read section which reads the timestamped data from the recording section, removes the timestamp information from the read timestamped data before outputting the resulting read data in accordance with the timestamp information.

10. The recording/output method according to claim 5, wherein a step of removing the timestamp information from the read timestamped data is performed after the step of reading the timestamped data, but before the step of outputting the resulting read data in accordance with the timestamp information.

11. The recording/output method according to claim 10, wherein the timestamp information generation operation is performed by the data write section, and the output operation is performed by the data read section.

12. The recording/output apparatus according to claim 6, wherein the data read section which reads the timestamped data from the recording section, removes the timestamp information from the read timestamped data before outputting the resulting read data in accordance with the timestamp information.

* * * * *